United States Patent
Englert

(10) Patent No.: US 9,645,556 B2
(45) Date of Patent: May 9, 2017

(54) AUTOMATION DEVICE

(71) Applicant: Markus Englert, Schifferstadt (DE)

(72) Inventor: Markus Englert, Schifferstadt (DE)

(73) Assignee: Siemens Aktiengesellschaft, Munich (DE)

( * ) Notice: Subject to any disclaimer, the term of this patent is extended or adjusted under 35 U.S.C. 154(b) by 357 days.

(21) Appl. No.: 14/085,889

(22) Filed: Nov. 21, 2013

(65) Prior Publication Data
US 2014/0148920 A1    May 29, 2014

(30) Foreign Application Priority Data
Nov. 23, 2012 (EP) .................................. 12194074

(51) Int. Cl.
G06F 19/00  (2011.01)
G05B 11/01  (2006.01)
G05B 19/042 (2006.01)

(52) U.S. Cl.
CPC .......... *G05B 11/01* (2013.01); *G05B 19/0426* (2013.01); *G05B 2219/31103* (2013.01); *G05B 2219/31104* (2013.01); *G05B 2219/31121* (2013.01); *G05B 2219/31135* (2013.01); *G05B 2219/31138* (2013.01); *Y02P 90/18* (2015.11)

(58) Field of Classification Search
USPC ....................................................... 700/3, 7
See application file for complete search history.

(56) References Cited

U.S. PATENT DOCUMENTS

| | | | | |
|---|---|---|---|---|
| 5,410,730 A | * | 4/1995 | Longsdorf | G05B 19/4185 710/15 |
| 6,185,508 B1 | * | 2/2001 | Van Doorn | G01R 21/1331 324/140 R |
| 6,294,889 B1 | * | 9/2001 | Briant | G05B 19/4185 318/16 |
| 6,449,715 B1 | | 9/2002 | Krivoshein | |

(Continued)

FOREIGN PATENT DOCUMENTS

| | | |
|---|---|---|
| DE | 100 49 049 | 12/2001 |
| DE | 102004014257 | 1/2005 |

(Continued)

OTHER PUBLICATIONS

Simeas, Power Meter, 1999-2004, Siemens AG, p. 1-27.*
(Continued)

*Primary Examiner* — Kidest Bahta
(74) *Attorney, Agent, or Firm* — Cozen O'Connor

(57) ABSTRACT

An automation device includes a master module, and a slave unit having a slave modules, where an interface module (IM) of the slave modules of the slave unit is connected to the master module via a bus, where each of the modules is parameterizable using a message transmitted to the IM by the master module, the message includes a data area for each of the slave modules for parameterization of each of the slave modules, and the message includes a data area for each slave module for its parameterization, wherein at least one default parameter data record is stored in at least one of the slave modules, and wherein a data record index, which is stored in that data area of the message which is provided for the at least one slave module is provided for accessing the at least one default parameter data record.

2 Claims, 5 Drawing Sheets

(56) References Cited

U.S. PATENT DOCUMENTS

| | | | | |
|---|---|---|---|---|
| 6,505,087 B1* | 1/2003 | Lucas | G05B 15/02 | 345/156 |
| 6,754,885 B1* | 6/2004 | Dardinski | G05B 15/02 | 717/113 |
| 7,114,021 B2* | 9/2006 | Seshadri | G06F 21/31 | 710/104 |
| 7,330,768 B2* | 2/2008 | Scott | G05B 23/0213 | 700/21 |
| 7,840,296 B2* | 11/2010 | Sanford | G05B 23/0245 | 700/108 |
| 8,219,790 B2 | 7/2012 | Chomik et al. | | |
| 8,898,622 B2* | 11/2014 | Resnick | G05B 15/02 | 717/104 |
| 2006/0041322 A1* | 2/2006 | Naismith | G05B 19/042 | 700/18 |
| 2006/0212134 A1* | 9/2006 | Dhawan | E21B 34/16 | 700/3 |
| 2007/0297148 A1* | 12/2007 | Gaub | H05K 7/1478 | 361/728 |
| 2008/0080395 A1* | 4/2008 | Law | G05B 19/4186 | 370/254 |
| 2009/0066527 A1* | 3/2009 | Teachman | G01R 22/10 | 340/657 |
| 2009/0172223 A1* | 7/2009 | Lee | G05B 19/054 | 710/104 |

FOREIGN PATENT DOCUMENTS

| | | |
|---|---|---|
| DE | 102007054417 | 5/2009 |
| DE | 102008038501 | 2/2010 |
| EP | 2071418 | 6/2009 |
| WO | WO 2010/020661 | 2/2010 |

OTHER PUBLICATIONS

Siemens NET, Network Gateway IE/PB Link PN IO, 2005, p. BL1-36.*

Siemens-Katalog ST PCS Jun. 7, 2012; Prozessleitsystem SIMATIC PCS 7; 2012.

* cited by examiner

AUTOMATION DEVICE

BACKGROUND OF THE INVENTION

1. Field of the Invention

The invention relates to an automation device having a master module, and a slave unit having a plurality of slave modules, where an interface module (IM) of the plurality of slave modules of the slave unit is connected to the master module via a bus, where each of the plurality of slave modules is parameterizable using a message transmitted to the IM by the master module, and where the message includes a data area for each of the plurality of slave modules for parameterization of each of the plurality of slave modules.

2. Description of the Related Art

An automation device is known from the Siemens catalog ST PCS 7, June 2012 edition, chapter 8. So-called "decentralized peripherals" are provided for tackling automation tasks in a decentralized manner in the field of production, process and method technology and usually comprise different slave units or peripherals that are provided with a plurality of slave modules and are each connected to a master module via an IM of the slave units and via a PROFIBUS DP. In this case, the master module is usually part of a powerful programmable logic controller that is provided with at least one CPU module and further functional modules and is intended to tackle more complex automation tasks, where the CPU module itself is able to be designed to undertake the tasks of the master module.

Actuators and/or sensors can be connected to these slave modules of a slave unit, where process peripheral input data transmitted from the sensors can be stored in the slave modules, and process peripheral output data that are transmitted to the slave modules by the master unit can be supplied to the actuators by the slave modules.

So that a slave unit formed with a plurality of slave modules can be used to tackle automation tasks, the slave modules must be parameterized. For this purpose, the master module transmits a message having a message identifier (i.e., a data record number), which indicates that the message is a parameter message, to the IM of the slave units via the bus. In addition to this message identifier, the message has data areas comprising the address of the slave unit to be addressed, the slot addresses or the slot numbers of the slave modules in the slave unit and parameters for parameterizing the slave modules. The size of these data areas of all slave modules usually must not exceed 244 bytes, which means that the number of slave modules which can be operated or used in a slave unit is restricted. For example, the situation may occur in which a data area of 50 bytes is respectively required for a first slave module and a second slave module of one manufacturer or supplier and a data area of 150 bytes is required for a slave module of another manufacturer on account of the multiplicity of parameters which can be set. This means that these three slave modules cannot be used together in a slave unit because the message length with respect to the data area of 244 bytes cannot be exceeded.

SUMMARY OF THE INVENTION

It is therefore an object of the invention to provide an automation device that can be used to increase the number of slave modules that can be used in a slave unit.

This and other objects and advantages are achieved by storing at least one default parameter data record in at least one of the slave modules, and by storing a data record index in the message in the data area provided for the at least one slave module, for accessing the at least one default parameter data record.

It is advantageous that the size of the data area of the message transmitted from the master module to the slave unit is considerably reduced and that the slave modules can be parameterized in a faster manner, in particular when starting up the automation device.

If the master module transmits a message to the slave unit, then the interface module of this slave unit identifies from the data record number that the message is a parameter message and also identifies, from the slot addresses or slot numbers, which slave modules need to be accessed with regard to their parameterization. By means of the data record index stored in the data area of the message, the slave module accesses the default data record stored in this slave module for its parameterization. Depending on the range of functions or expansion level of a slave module, this slave module may have a plurality of default data records, where a data record index is respectively provided for each of these default data records.

In accordance with the invention, the large memory of the slave module(s), which is present anyway, is used to largely avoid the interfering effects of the small size of the parameter data area in the message.

In one embodiment of the invention, envisaged or intended changes of parameters in the at least one default parameter data record are likewise stored in that data area of the message which is provided for the at least one slave module. If a default parameter, such as the baud rate, is not intended to be accepted in the default parameter data record and is intended to be replaced with a new value, this is indicated in the data area in the message via a byte or bit identifier, which corresponds to the byte or bit in the default parameter data record, and the new baud rate. The baud rate originally stored in this byte or bit in the default parameter data record is replaced with the new baud rate with respect to the parameterization of the slave module. Based on such measures, changes can be easily made to the at least one default parameter data record and no further default parameter data records need to be created for a multiplicity of parameter configurations.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its refinements and advantages are explained in more detail below using the drawing which illustrates an exemplary embodiment of the invention and in which, in which.

DETAILED DESCRIPTION OF THE PREFERRED EMBODIMENTS

The same parts illustrated in FIGS. 1 to 5 are provided with the same reference symbols.

Figure 5:
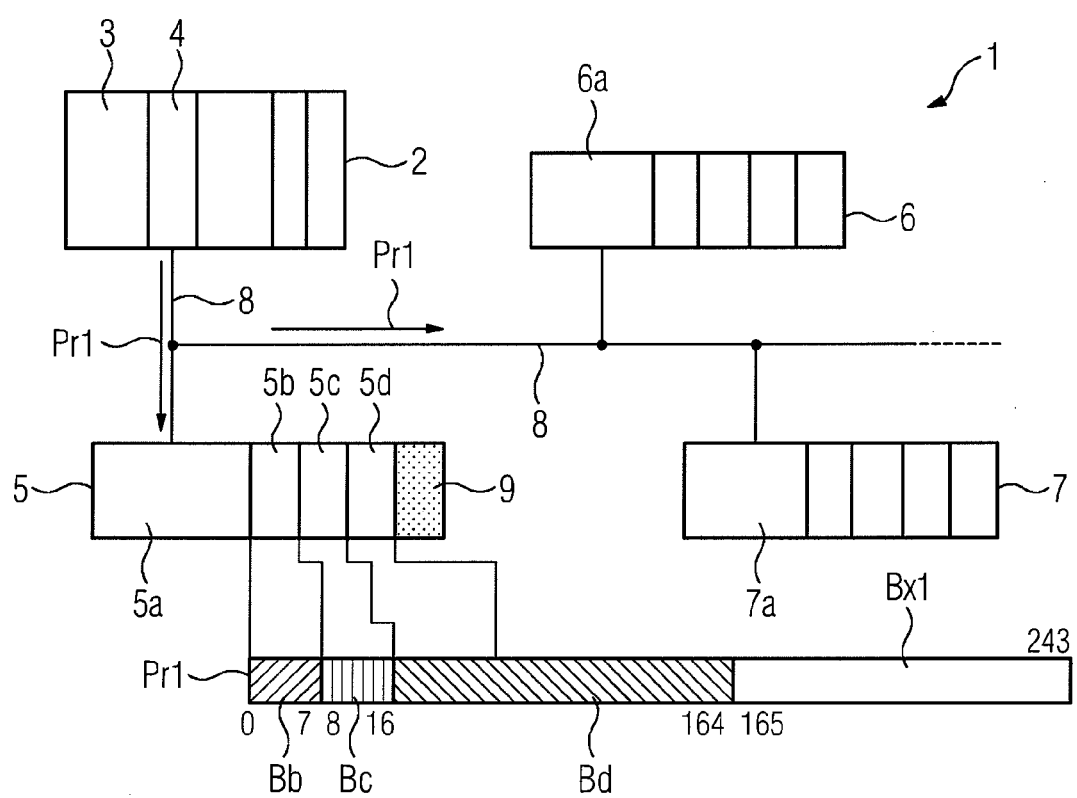

With initial reference to FIG. 5, which illustrates a conventional automation device 1, parts of this automation device 1 for controlling a technical process are a programmable logic controller 2 having a CPU module 3, a master module 4 and three slave units 5, 6, 7. The slave units 5, 6, 7 each have an interface module 5a, 6a, 7a which is used by the master module 4 to have read and/or write access to the slave modules of the slave units 5, 6, 7. It should be understood that the programmable logic controller 2 has further modules, such as a plurality of analog and/or digital input/output modules, communication modules and other modules suitable for operating the programmable logic controller 2 and for controlling the process. In addition, it should be understood that the CPU module 3 itself may be designed to undertake the tasks of the master module 4.

In the present exemplary embodiment, only slave modules 5b, 5c, 5d of the slave unit 5 are illustrated for the sake of clarity. In order to parameterize these modules, the master module 4 transmits a parameter message Pr1 to the interface module 5a of this slave unit 5 via a bus 8, such as a PROFIBUS DP. This message Pr1 comprises a data record number that indicates to the slave units 5, 6, 7 that the message Pr1 is a parameter message. The message Pr1 also comprises an address for addressing the slave unit 5 and data areas Bb, Bc, Bd assigned to the slave modules 5b, 5c, 5d. These data areas Bb, Bc, Bd are each provided with a slot number or slot address for addressing the respective slave module 5b, 5c, 5d and also have parameters for parameterizing the respective slave module 5b, 5c, 5d. In the example shown, the size of the data areas Bb, Bc in the message Pr1 is 8 bytes in each case and, in contrast, the size of the data area Bd is 150 bytes, which indicates that, for the slave module 5d, considerably more parameters are needed to parameterize this slave module 5d in comparison with the slave modules 5b, 5c.

On account of the fact that only 79 bytes (area Bx1) of the maximum length of 244 bytes can be occupied in the message Pr1, a further slave module can be plugged into a free slot 9 of the slave unit 5 only if the data (i.e., slot address, parameters) for this slave module do not exceed these 79 bytes.

In order to make it possible for a further slave module, for which more than 79 bytes of data are required, to also be able to be inserted into the free slot 9 in the slave unit 5 in this case, slave modules are provided and are configured such that a default parameter data record is stored in a memory of such slave modules and can be accessed using a data record index. This index is stored in that data area of the message which is provided for this slave module, which message is transmitted by the master module to the interface module of the respective slave unit. Such slave modules, for which a multiplicity of parameters are needed for their parameterization, are preferably configured as described.

Figure 1:
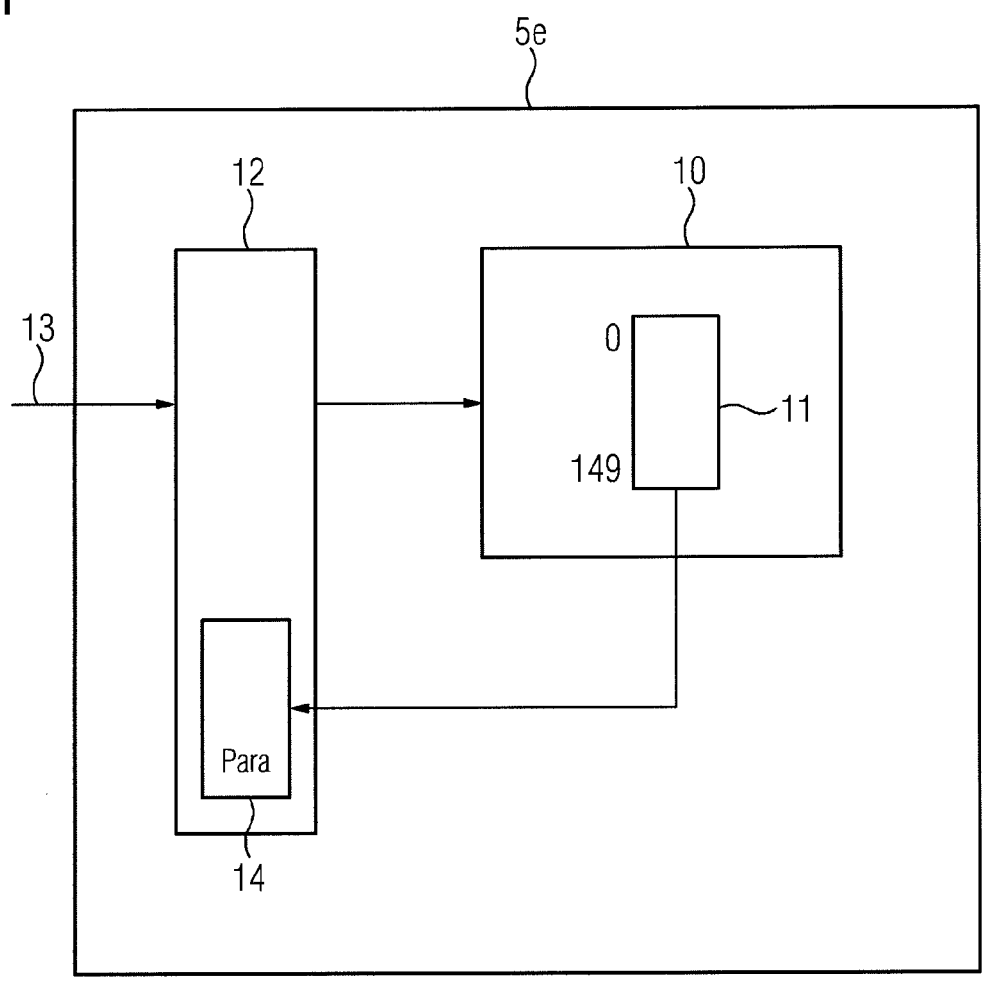
FIGS. 1 and 3 show a slave module.

FIG. 1 shows such a slave module 5e having a memory 10 that stores a default parameter data record 11 having parameters, this data record having a size or length of 150 bytes. Based on a data record index 13 supplied to a controller 12 of the slave module 5e, the default parameter data record 11 is loaded into a parameter memory 14 of the controller 12, as a result of which the slave module 5e is parameterized. As described, the data record index is part of a parameter message which is transmitted by the master module to a slave unit.

Figure 2:
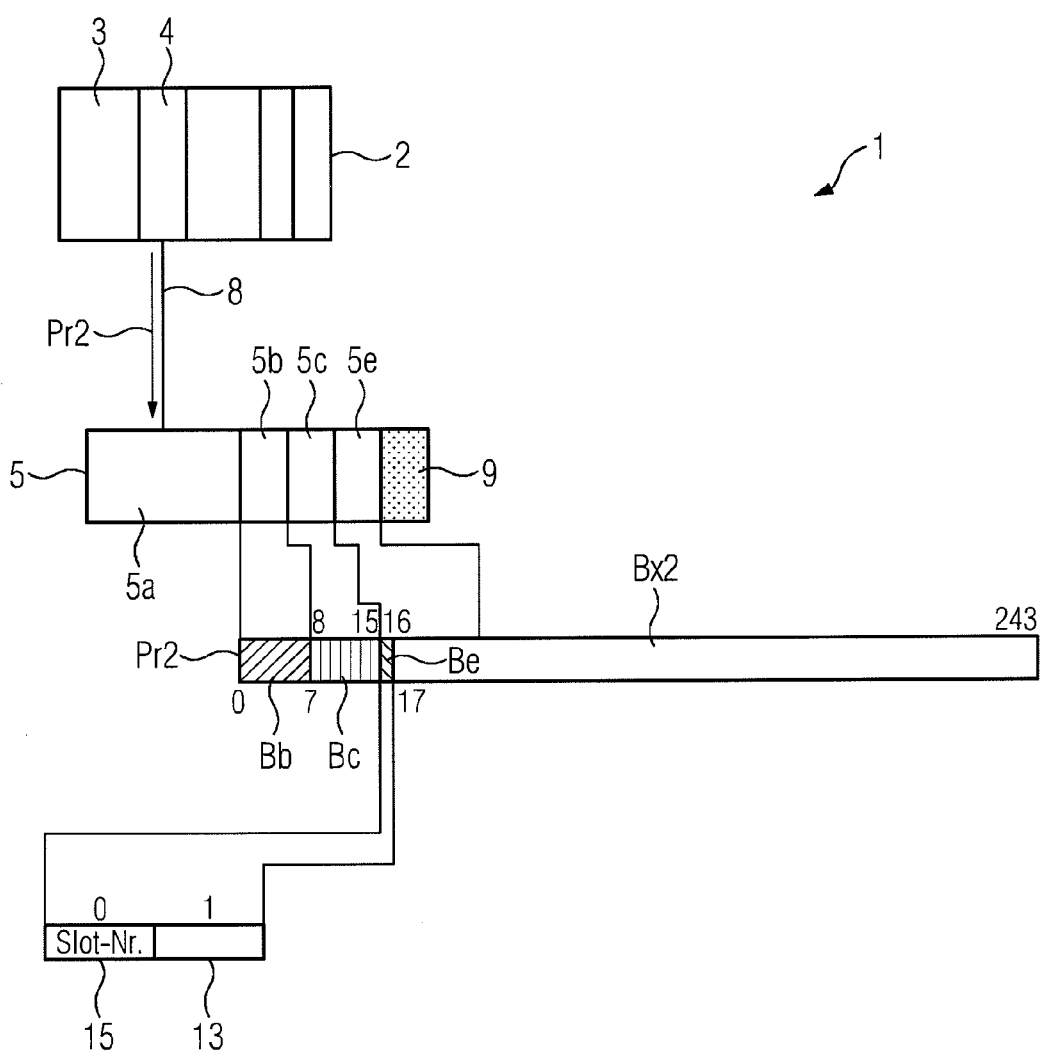
FIGS. 2, 4 and 5 show an automation device.

For the purpose of a more detailed explanation, reference is made to FIG. 2 which, for greater clarity, illustrates the automation device 1 described in FIG. 5 without the slave units 6, 7. Instead of being equipped with the slave module 5d (see FIG. 5), the slave unit 5 is equipped with the slave module 5e, where the master module 4 supplies a parameter message Pr2 to the slave unit 5 to parameterize the slave modules 5b, 5c, 5e. In contrast to the parameter message Pr1 (see FIG. 5), this parameter message Pr2 has, instead of the data area Bd, a data area Be with a length of 2 bytes, in which only the data record index 13 and a slot number 15 or slot address are stored. In the present exemplary embodiment, the numbers "2, 3, 4" are allocated to the slave modules 5b, 5c, 5e as slot numbers 15. As described, the interface module 5a uses this slot number 15 to address the slave module 5e, and the data record index 13 is used to indicate to the slave module 5e that the default parameter data record 11 comprising 150 bytes should be transmitted from the memory 10 to the parameter memory 14. As a result of the fact that the size of the area Be is only 2 bytes, 227 bytes can be used as a free area Bx2 in the message Pr2 for the purpose of parameterizing further slave modules.

It should be understood that the slave modules 5b, 5c can be configured in a manner corresponding to the slave module 5e, only 2 bytes—1 byte for a slot number and 1 byte for a data record index—likewise being required in this case for the areas Bb, Bc in the message, and the slave modules 5b, 5c each also having a default parameter data record having a length or size of 8 bytes.

The situation may occur in which a slave module can be configured in various ways depending on the operating mode and functionality. In order to be able to set different configurations using the parameters, the slave module in this case has a plurality of default parameter data records which are again referenced using a data record index. In the present exemplary embodiment, five default parameter data records D1 to D5 of the same data structure or the same format are provided for a slave module 5f (see FIG. 3) and are stored in a memory 16 of the slave module 5f. Each of these default parameter data records D1 to D5 each comprising 150 bytes is again accessed using the data record index 13. The data record index 13, for example an index "3", causes the controller 12 to enter the default parameter data record D3 in the parameter memory 14.

The situation may also occur in which some parameters stored in a default parameter data record must frequently be changed, but the intention is to dispense with storing a multiplicity of default parameter data records for the different parameter configurations or settings in a slave module. In order to restrict the number of default parameter data records stored in this slave module, provision is therefore made for parameters which need to be frequently changed to be able to be accessed in a default parameter data record and to be easily changed.

Figure 3:
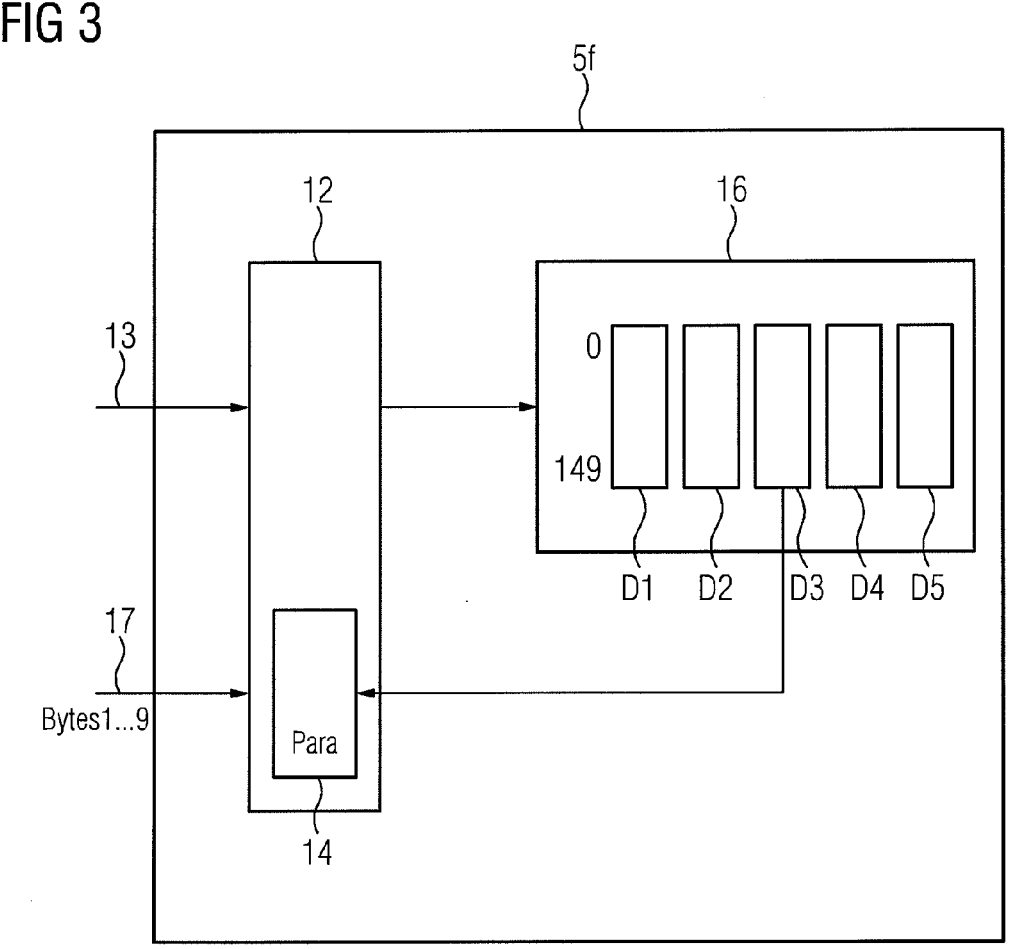
Figure 4:
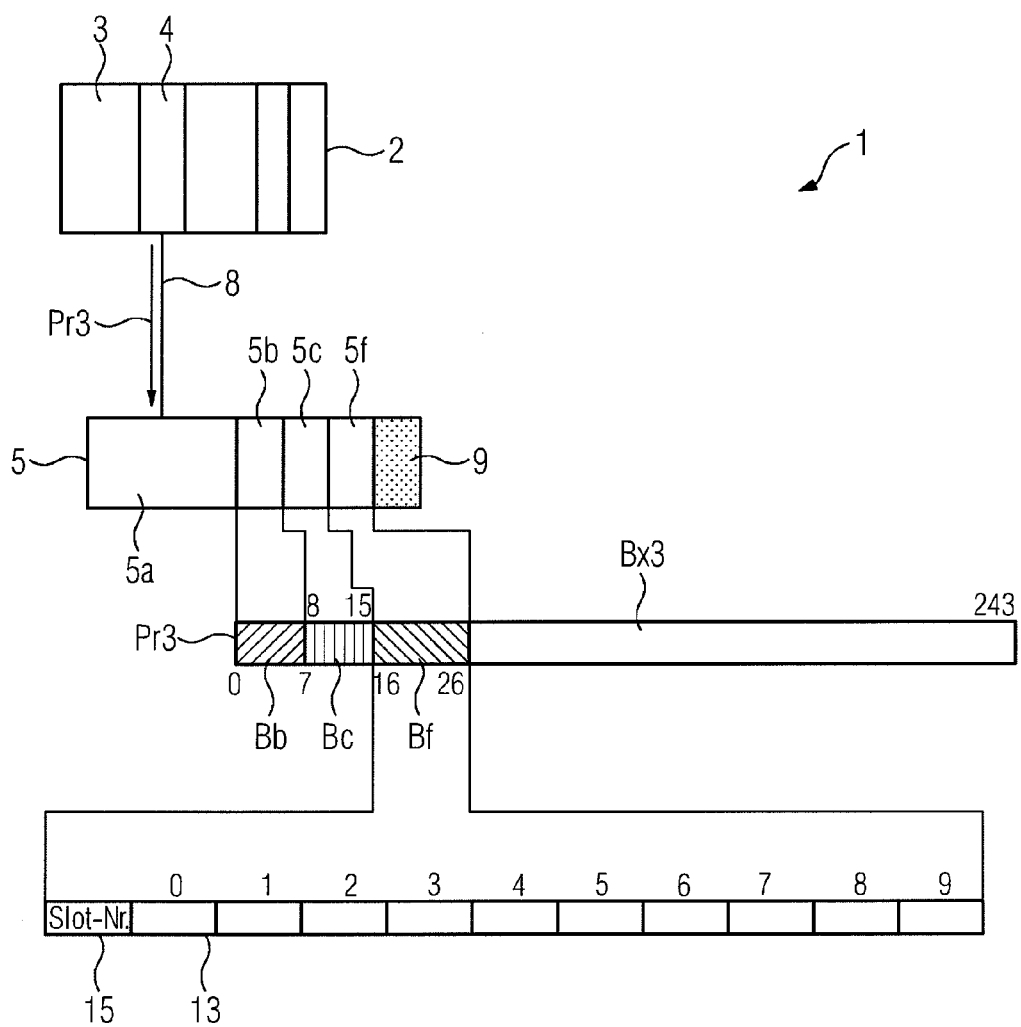

It is assumed below that parameters that need to be frequently changed are stored in bytes 1 to 9 in the default parameter data record D3 (see FIG. 3). These 9 bytes are accessed by reserving a further 9 bytes 1 to 9, in which the new parameters are stored (see FIG. 4), in an area Bf assigned to the slave module 5f in a parameter message Pr3. Here, the interface module 5a uses the slot number 15 to address the slave module 5f and uses the data record index 13 to address the default parameter data record D3, based on which this default parameter data record D3 is loaded into the parameter memory 14, in which case, on account of the new parameters stored in bytes 1 to 9, the parameters loaded into the parameter memory 14 are overwritten in the bytes which correspond or are assigned to these bytes 1 to 9, which is indicated in FIG. 3 via a reference symbol 17. As described, such measures reduce the number of default parameter data records to be stored in the memory 16 of the slave module 5*f,* but also reduce a free area Bx3 in the parameter message Pr3 because additional bytes 1 to 9 need to be reserved or specified in said message to make changes in the referenced default parameter data record D3.]

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automation device comprising:
   a programmable logic controller having a CPU module and a master module;
   a slave unit having a plurality of slave modules, an interface Module (IM) of the plurality of slave modules of the slave unit being connected to the master module of the programmable logic controller via a bus, each of the plurality of slave modules being parameterizable using a message transmitted to the IM by the master module of the programmable logic controller, the message having a data area for each of the plurality of slave modules for parameterization of each of the plurality of slave modules;
   wherein at least one default parameter data record is stored in at least one slave module of plurality of slave modules;
   wherein a data record index, which is stored in the data area of the message which is provided for the at least one slave module is provided for accessing the at least one default parameter data record; and
   wherein the IM identifies from the data record index whether the message is a parameter message and identifies from slot addresses of the plurality of slave modules which of the plurality of slave modules require access with respect to their parameterization.

2. The automation device as claimed in claim 1, wherein envisaged changes of parameters in the at least one default parameter data record are also stored in the data area of the message which is provided for the at least one slave module.

* * * * *